United States Patent [19]

Giordano, Jr. et al.

[11] Patent Number: 4,784,769

[45] Date of Patent: Nov. 15, 1988

[54] PLASMA POLYMERIZED ACETONITRILE PROTECTIVE COATINGS AND METHOD OF PREPARATION THEREFOR FOR ULTRAFILTRATION/MICROFILTRATION MEMBRANES

[75] Inventors: Paul J. Giordano, Jr., Hudson; Richard C. Smierciak, Streetsboro, both of Ohio

[73] Assignee: The Standard Oil Company, Cleveland, Ohio

[21] Appl. No.: 933,433

[22] Filed: Nov. 21, 1986

[51] Int. Cl.$^4$ .................. B01D 39/08; B05D 3/06; B05D 5/00

[52] U.S. Cl. .................. 210/500.21; 210/500.27; 210/500.41; 210/506; 427/40; 427/41; 427/244; 427/245

[58] Field of Search .................. 427/39, 40, 41, 244, 427/245, 38; 210/500.41, 500.42, 500.43, 490, 654, 506, 507, 500.21, 500.27

[56] References Cited

U.S. PATENT DOCUMENTS

| | | | |
|---|---|---|---|
| 3,657,113 | 4/1972 | Stancell et al. | 210/23 |
| 3,775,308 | 11/1973 | Yasuda | 210/23 |
| 3,847,652 | 11/1974 | Fletcher et al. | 117/93.1 |
| 4,032,440 | 6/1977 | Yasuda | 210/23 |
| 4,100,113 | 7/1978 | McCain | 521/38 |
| 4,188,426 | 2/1980 | Auerbach | 427/40 |
| 4,199,448 | 4/1980 | Johnson et al. | 210/23 |
| 4,252,848 | 2/1981 | Datta et al. | 428/64 |
| 4,618,533 | 10/1986 | Steuck | 427/245 |

FOREIGN PATENT DOCUMENTS 0116286 10/1978 Japan ................. 427/41

*Primary Examiner*—Michael R. Lusignan
*Assistant Examiner*—Margaret Burke
*Attorney, Agent, or Firm*—Sue E. Phillips; Joseph G. Curatolo; Larry W. Evans

[57] ABSTRACT

The present invention relates to a process for coating an ultrafiltration/microfiltration membrane with a thin protective thin film comprising:

(a) loading the ultrafiltration/microfiltration membrane in an enclosed reactor;
(b) evacuating the reactor;
(c) charging the reactor with an inert carrier gas and a gaseous nitrogen-containing organic monomer; and
(d) plasma-polymerizing the organic monomer such that a thin-film protective coating of the polymerized monomer is deposited on the entire effective surface of the membrane.

The present invention further relates to a nonfouling membrane comprising an ultrafiltration/microfiltration membrane substrate on which is deposited an anti-fouling polymerized nitrogen-containing organic monomer thin film protective coating.

8 Claims, No Drawings

PLASMA POLYMERIZED ACETONITRILE PROTECTIVE COATINGS AND METHOD OF PREPARATION THEREFOR FOR ULTRAFILTRATION/MICROFILTRATION MEMBRANES

FIELD OF THE INVENTION

The present invention provides for the reduction of fouling of ultrafiltration membranes by protectively coating the membranes with a plasma polymerized nitrogen-containing monomer.

BACKGROUND OF THE INVENTION

Plasma polymerization, as well as numerous other techniques, have been used to prepare membranes for filtration purposes. The membranes formed by the process consist of substrates upon which are deposited coatings of polymeric compounds. The composite membranes thus formed act as selective filtering devices. Known substrate materials include porous glass and ceramics, and a variety of organic polymer materials which will readily support the polymeric compound coating which is deposited thereon to form the desired membrane.

U.S. Pat. No. 3,775,308 discloses a semipermeable composite membrane formed by electrodeless glow discharge polymerization of an organic monomer in the presence of a porous support. This patent teaches the combination of various porous support materials with organic monomers to yield a membrane which possesses filtration characteristics. The membranes therein are utilized as reverse osmosis membranes in desalination devices.

U.S. Pat. No. 4,032,440 accomplishes the same type of membrane preparation as just mentioned. This patent, however, combines both an organic monomer and an inorganic monomer with a support material to yield a composite membrane for reverse osmosis consisting of a porous support substrate coated with a copolymer.

These membranes, however, as well as other conventionally prepared membranes, demonstrate a tendency to foul during the filtration process, which has been an industry recognized concern. As used herein, the term "foul" refers to the blocking and plugging of membrane pores during the filtration process. Fouling is due to membrane polarization and the formation on the membrane surface of sub-layers of particles and other compounds present in the filtration system. The build-up of these sublayers causes reduced flux rates and eventually clogs the membrane pores completely.

A further contributor to flux rate loss, common in the filtration of biological systems, is foaming and frothing. Antifoam agents are often used at various stages of processing to control foam problems. Antifoam agents are, however, generally hydrophobic and therefore tend to concentrate on interfaces, thus contributing to the fouling of the membrane. The adsorption of the antifoam onto the membrane surface causes increased reduction in flux rates and may even cause increased macromolecule retention.

There is a present need for a means of reducing the fouling of ultrafiltration and microfiltration membranes. Further, in systems where antifoam agents are utilized, the need is even more pressing, as such agents tend to quickly and irreversibly foul membranes, thus causing increased flux reduction and correlative loss in efficiency.

It is one object of the present invention, therefore, to provide a process by which membranes used for ultrafiltration/microfiltration purposes can be protectively coated such that fouling is substantially reduced.

It is a further object of the present invention to provide a protective membrane coating which allows for continued optimum flux rate of the membrane even after the addition of antifoam agents to the filtration system.

These and other objects of the present invention will become apparent to one skilled in the art from a reading of the following description of the invention and the appended claims.

SUMMARY OF THE INVENTION

The present invention relates to a process for coating an ultrafiltration/microfiltration membrane with a thin protective thin film comprising:
(a) loading the ultrafiltration/microfiltration membrane in an enclosed reactor;
(b) evacuating the reactor;
(c) charging the reactor with an inert carrier gas and a gaseous nitrogen-containing organic monomer; and
(d) plasma polymerizing the organic monomer such that a thin-film protective coating of the polymerized monomer is deposited on the entire effective surface of the membrane.

The present invention further relates to a nonfouling membrane comprising an ultrafiltration/microfiltration membrane substrate on which is deposited, an anti-fouling polymerized nitrogen-containing organic monomer thin film protective coating.

DETAILED DESCRIPTION OF THE INVENTION

The subject invention involves the deposition of a thin, protective coating on an ultrafiltration or microfiltration membrane surface by means of plasma polymerization. As used herein, the term "membrane" indicates that the substrate material is a membrane usable in its instant state for the filtration or separation of a given feed stream. The term "protective" coating refers to a thin film deposited on the membrane surface suitable to impart antifouling properties thereto without deleterious effect on the filtering characteristics thereof. We have found suitable thickness ranges to be 1–500 Angstroms, or preferably 100–300 Angstroms.

While the contemplated membrane use is directed to the ultrafiltration or microfiltration of fluids of biological origin, such as milk, fruit juice, cheese whey, fermentation broth, meat processing water washes, and cell lysates, those skilled in the art would be knowledgeable as to other filtration systems which would be enhanced by the membrane coating process disclosed herein, as well as those systems for which this process would not be advantageous, such as reverse osmosis.

Any membrane suitable for use as an ultrafiltration or microfiltration membrane may be protectively coated by deposition of a plasma polymerized thin film coating of an appropriate organic monomer according to the subject inventive procedure. Such membranes include polysulfone membranes, such as those commercially available through Millipore and Amicon. Exemplary of these membranes are the 10,000 MWCO (molecular weight cut-off) (PTGC) membrane and 100,000 MWCO (PTHK) membrane, available from Millipore, and the 10,000 MWCO (PM10) membrane available from Amicon.

In the process of the present invention, the membrane substrate remains the active filtration device of the system, even after being coated as herein described. The coating applied to the membrane does not enhance the filtration property thereof, but rather decreases the propensity of the membrane to foul, which fouling otherwise detracts from the membrane performance.

Organic monomers considered useful as coating precursors within the subject inventive method include nitrogen-containing monomers. The monomer will polymerize from the plasma state such that a thin film coating of protective polymer is deposited uniformly over the entire effective membrane surface. Preferable monomers contain a nitrogen linkage with some degree of aromaticity as this type of configuration is believed to provide for greater ease in free radical production.

An example of a nitrogen-containing monomer is acetonitrile, $CH_3CN$. In acetonitrile there is present only carbon-carbon single bonds and carbon-hydrogen bonds with bond energy in the 85–105 Kcal/mole range, along with the very strong carbon-nitrogen triple bond with bond energy of approximately 200 Kcal/mole. The large difference in bond energies between the reactive carbon-hydrogen bonds and carbon-carbon bonds and the carbon-nitrogen triple bond results in increased functionality in the deposited film. The film exhibits a qualitative similarity to high molecular weight polyfumeronitrile which also has a large amount of unsaturation in the form of six member rings. The plasma deposition of a film containing large amounts of unsaturation and in the form of six member rings results in the superior protective properties of the film, enhancing its use as a coating for ultrafiltration/microfiltration membranes.

Other exemplary nitrogen-containing monomers are the following: aromatic and aliphatic nitriles, such as acetonitrile, acrylonitrile, propionitrile, and benzonitrile; aromatic and aliphatic saturated and unsaturated amines, such as propylamine and allylamine; and aromatic and aliphatic mixtures of saturated and unsaturated hydrocarbon monomers with nitrogen or ammonia comonomers.

The presence of free radicals in the polymerization process allows for cross-linking of the monomer segments in such a manner that the resultant coating is a pinhole-free, hard, smooth surface. The coating enhances resistance of the membrane to fouling due to changes in the surface energy of the protected membrane, yielding a more hydrophilic surface. Consequently, the surface behaves in a more hydrophilic manner with respect to the adsorption of protein on ultrafiltration surfaces and thus fouling is reduced.

The plasma polymerized coating herein is the result of subjecting the organic monomer, in the gaseous state, to electromagnetic energy of an appropriate frequency and power such that a plasma of the gaseous medium is formed. The gaseous monomer is exposed to a plasma glow discharge which forms ion-radicals and other electronically excited species which deposit on the membrane surface and are polymerized, yielding a protective coating thereon.

A suitable apparatus for coating a given substrate according to the procedure disclosed herein is a microwave plasma generator system. This system includes a vacuum chamber, such as a glass tube reactor, glass bell jar or other similar enclosure. This glass portion is enclosed by an electromagnetic energy plasma generator. The substrate to be coated is positioned within the tube such that maximum coating deposition occurs with uniformity of coverage. A first outlet into the reaction tube allows for evacuation of the system, and two other outlets are connected to gas bleed systems, one for adding the organic monomer gas, and the other for an inert carrier gas, such as nitrogen, helium, argon, or other appropriate carrier gas.

In carrying out the coating process, the glass reaction tube is first evacuated to about $10^{-3}$ to about $10^{-6}$ Torr. The tube is then charged with an inert gas as a carrier gas, at a flow rate of about 1–100 SCCM, and then with the monomer to be coated on the substrate also at a flow rate of about 1–100 SCCM. At this time, electromagnetic energy at a frequency of about 450 MHZ is generated by the electromagnetic energy plasma generator at between 10–100 watts of power. The frequency of the electromagnetic energy may range from about 13 MHZ to about 2000 MHZ. This flow of electromagnetic energy initiates a glow discharge causing deposition of the plasma polymerized coating.

The coating possesses anti-fouling characteristics and is pinhole and void free due to extensive cross-linking. The thickness of the coating is determined by the length of time for which the membrane substrate is exposed to the polymerization. Generally, using the type of apparatus and the operating parameters disclosed above, said about two minutes exposure the coating will exceed 1,000 Angstrom thickness, which will totally clog the membrane pores, making the membrane unusable for filtration purposes. At less than 1 minute of exposure of resultant coating will have a thickness of about 500 Angstroms, which is operable according to the invention. Preferably, however, the membrane should be exposed to the polymerization for about 15 to about 30 seconds, which will result in an optimum coating thickness of about 100 to about 300 Angstroms, which coating will uniformly cover all effective membrane surfaces, including the pore surfaces.

The deposition of a nitrogen-containing monomer, deposited as a thin film coating on an ultrafiltration/microfiltration membrane by the above process, is useful to protect the membrane from fouling and thus maintains efficient and effective flux rates when filtering various fluid substances. The process is also useful for modification of the diffusion characteristics in plasma deposited hyperfiltration/ultrafiltration membranes. While these are some useful applications of the instant process, those skilled in the art will know of other uses where the subject process will be equally applicable.

EXAMPLE 1

The membrane to be coated was placed in the glass reaction tube, which was evacuated to $10^{-3}$ Torr over a 1–2 hour period. Argon was charged to the reactor at $10^{-1}$ Torr at 1–10 SCCM, and acetonitrile was charged at 1–10 SCCM. Electromagnetic energy in a frequency range of between 400–800 MHZ was directed into the reactor at a current density of 20 watts. The effective surface of the Millipore 10,000 MWCO membrane which was used, including the pore surfaces, was uniformly coated with a thin film of polymerized acetonitrile.

The membrane prepared above was tested and the results were compared to that of an unmodified, or uncoated, membrane of the same type as that used above. The test was run under laboratory conditions, ambient temperature and at a transmembrane pressure of about 35 psi. After 25 minutes of filtering in a clear water solution, PPG-2000, a commercially available anti-foam, was added to both test systems. The flux rates for both the unmodified and the thin film-coated membranes taken at timed intervals are set forth in Table 1 below.

TABLE 1

Comparison of Millipore 10,000 MWCO Membrane to Plasma Modified Millipore 10,000 MWCO membrane in Water Flux

| TIME (MIN.) | 10,000 MWCO (GFD)** | PLASMA/ 10,000 MWCO (GFD)** |
|---|---|---|
| 1 | 52 | 55 |
| 3 | 48 | 53 |
| 5 | 45 | 52 |
| 10 | 40 | 52 |
| 15 | 38 | 50 |
| 20 | 38 | 46 |
| 25* | 35 | 46 |
| 26 | 12.5 | 46 |
| 27 | 10 | 46 |
| 29 | 8.5 | 42 |
| 30 | 8.5 | 46 |
| 35 | 7.0 | 40 |
| 40 | 5 | 36 |
| 45 | 3 | 36 |
| 50 | 5 | 36 |

**GFD = Gallons/Square Foot/Day
*PPG-2000 Added

As the data in Table 1 represents, the addition of the anti-foam caused the flux rate of the uncoated membrane to drop significantly, while the coated membrane flux rate dropped only slightly.

EXAMPLE 2

The same procedure as in Example 1 was used to coat a Millipore 10,000 MWCO membrane with acetonitrile charged at 1 SCCM, with Argon charged at 5 SCCM, in 120 mTorr pressure.

TABLE 2

| PLASMA TIME | FLUX AT 25 MIN. (GFD) | FLUX AFTER PPG 2000 (GFD) |
|---|---|---|
| 15 Sec. | 53.6 | 34.6 |
| 10 Min. | 0 | 0 |
| 1 Min. | 50.2 | 36.3 |
| 10 Sec. | 55.4 | 36.3 |
| 20 Sec. | 62.3 | 43.3 |
| 1 Min. | 29.4 | 31.1 |
| 10 Min. | 0 | 0 |
| 20 Sec. | 65.7 | 38.1 |
| 10 Sec. | 53.6 | 26.0 |

This data demonstrates changes in flux rate as a function of the amount of time that the membrane was exposed to the plasma polymerization. It is noted that after 10 minutes the coating had become so thick that the membrane pores have been completely blocked.

EXAMPLE 3

The same procedure as in Example 1 above was used to coat an Amicon PM10 (10,000 MWCO) membrane. The plasma-modified membrane was tested against an unmodified membrane during a continuous run in consecutive water/fruit juice/water wash. The flux rate of the two membranes was tested at the intervals designated in Table 3 and the resultant data is set forth in Table 3 below.

TABLE 3

COMPARISON OF PM10 MEMBRANE TO PLASMA-MODIFIED PM10 MEMBRANE IN FRUIT JUICE FLUX

| FEED | TIME (MIN.) | PM10 FLUX (GFD) | PLASMA/PM10 FLUX (GFD) |
|---|---|---|---|
| Water | 21 | 309.8 | 257.6 |
| Water | 44 | 231.9 | 214.2 |
| Water | 71 | 203.5 | 188.6 |
| Water | 102 | 183.1 | 179.5 |
| Juice | 131 | 9.4 | 20.5 |
| Juice | 168 | 7.6 | 17.4 |
| Juice | 210 | 6.3 | 15.0 |
| Juice | 259 | 5.5 | 14.3 |
| Juice | 309 | 5.0 | 13.1 |
| Juice | 358 | 4.5 | 11.8 |
| Juice | 408 | 4.0 | 11.1 |
| Juice | 468 | 3.9 | 11.7 |
| Water | 495 | 12.7 | 25.2 |
| Water | 511 | 13.8 | 26.1 |
| Water | 525 | 14.2 | 26.7 |
| Water | 540 | 14.5 | 27.2 |

The Table 3 data indicates superior flux retention in the plasma-modified membrane over the unmodified membrane when filtering fruit juice. The unmodified membrane is more quickly fouled than the modified membrane even when filtering water, as is seen by the data taken at 21 min., 44 min., 71 min., and 102 min.

Although several acetonitrile-coated membranes have been exemplified herein, it will be readily appreciated by those skilled in the art that the other membrane substrates and coatings encompassed in the teachings herein could be substituted therefor.

It is to be understood that the foregoing examples have been provided to enable those skilled in the art to have representative examples by which to evaluate the invention and that these examples should not be construed as any limitation on the scope of this invention. Inasmuch as the coating composition and membrane/substrate choice can be varied within the scope of the total specification disclosure, neither the particular monomer or membrane nor the specific operating parameters exemplified herein shall be construed as limitations of the invention.

Thus, it is believed that any of the variables disclosed herein can readily be determined and controlled without departing from the spirit of the invention herein disclosed and described. Moreover, the scope of the invention shall include all modifications and variations that fall within that of the attached claims.

What we claim is:

1. A process for coating an ultrafiltration/microfiltration membrane with a protective thin film comprising:
    (a) loading said ultrafiltration/microfiltration membrane in an enclosed reactor;
    (b) evacuating said reactor;
    (c) charging said reactor with an inert carrier gas and gaseous acetonitrile monomer;
    (d) plasma-polymerizing said organic monomer such that a thin-film protective coating of said polymerized monomer is deposited on the entire effective surface of said membrane.

2. The process as in claim 1 wherein said membrane is a polysulfone membrane.

3. The process as in claim 1 wherein said thin film protective coating is deposited to a thickness of between about 100 to about 500 Angstroms.

4. The process as in claim 3 wherein said thin film protective coating is deposited to a thickness of between 100 and 300 Angstroms.

5. A nonfouling membrane comprising an ultrafiltration/microfiltration membrane surface on which is deposited an anti-fouling polymerized acetonitrile monomer thin film protective coating.

6. The membrane as in claim 5 wherein said thin film protective coating is between about 100 and about 500 Angstroms thick.

7. The membrane as in claim 6 wherein said thin film protective coating is between about 100 and about 300 Angstroms thick.

8. The membrane as in claim 5 wherein said ultrafiltration/microfiltration membrane substrate is a polysulfone membrane.

* * * * *